(12) United States Patent
Ciaccia

(10) Patent No.: US 7,799,880 B2
(45) Date of Patent: Sep. 21, 2010

(54) PROCESS FOR THE POLYMERIZATION OF OLEFINS

(75) Inventor: Eleonora Ciaccia, Ferrara (IT)

(73) Assignee: Basell Polyolefine GmbH, Wesseling (DE)

(*) Notice: Subject to any disclaimer, the term of this patent is extended or adjusted under 35 U.S.C. 154(b) by 387 days.

(21) Appl. No.: 11/886,929

(22) PCT Filed: Mar. 22, 2006

(86) PCT No.: PCT/EP2006/060941

§ 371 (c)(1),
(2), (4) Date: Sep. 21, 2007

(87) PCT Pub. No.: WO2006/100258

PCT Pub. Date: Sep. 28, 2006

(65) Prior Publication Data

US 2009/0023873 A1    Jan. 22, 2009

Related U.S. Application Data

(60) Provisional application No. 60/666,219, filed on Mar. 29, 2005.

(30) Foreign Application Priority Data

Mar. 23, 2005  (EP) ................................. 05102348

(51) Int. Cl.
*C08F 4/6592* (2006.01)
*C08F 4/642* (2006.01)

(52) U.S. Cl. .................... 526/161; 526/65; 526/66; 526/78; 526/160; 526/165; 526/348; 526/943; 502/103; 502/152; 502/155

(58) Field of Classification Search ................ 526/65, 526/66, 78, 160, 161, 165, 348, 943; 502/103, 502/152, 155
See application file for complete search history.

(56) References Cited

U.S. PATENT DOCUMENTS

| | | |
|---|---|---|
| 4,178,272 A | 12/1979 | Meyer, Jr. et al. |
| 5,698,487 A | 12/1997 | Sacchetti et al. |
| 5,770,664 A | 6/1998 | Okumura et al. |
| 5,770,753 A | 6/1998 | Küber et al. |
| 5,786,432 A | 7/1998 | Küber et al. |
| 5,840,644 A | 11/1998 | Küber et al. |
| 6,051,727 A | 4/2000 | Küber et al. |
| 6,242,544 B1 | 6/2001 | Küber et al. |
| 6,255,506 B1 | 7/2001 | Küber et al. |
| 6,306,996 B1 | 10/2001 | Cecchin et al. |
| 6,399,533 B2 | 6/2002 | Sacchetti et al. |
| 6,444,833 B1 | 9/2002 | Ewen et al. |
| 6,492,539 B1 | 12/2002 | Bingel et al. |
| 6,559,252 B1 | 5/2003 | Horton et al. |
| 6,608,224 B2 | 8/2003 | Resconi et al. |
| 6,635,779 B1 | 10/2003 | Ewen et al. |
| 6,841,501 B2 | 1/2005 | Resconi et al. |
| 6,878,786 B2 | 4/2005 | Resconi et al. |
| 6,949,614 B1 | 9/2005 | Schottek et al. |

(Continued)

FOREIGN PATENT DOCUMENTS

DE    19917985    10/2000

(Continued)

OTHER PUBLICATIONS

C. Carman et al., "Monomer Sequence Distribution in Ethylene-Propylene Rubber Measured by $^{13}$C NMR. 3. Use of Reaction Probability Model," *Macromolecules*, vol. 10(3), p. 536-544 (1977).

(Continued)

*Primary Examiner*—Caixia Lu
(74) *Attorney, Agent, or Firm*—William R. Reid

(57) ABSTRACT

A multistep process comprising the following steps:
step a) polymerizing propylene and optionally one or more monomers selected from ethylene or alpha olefins of formula $CH_2=CHT^1$, wherein $T^1$ is a $C_2$-$C_{10}$ alkyl radical in the presence of a catalyst system supported on an inert carrier, comprising:
ii) one or more metallocene compounds of formula (I):

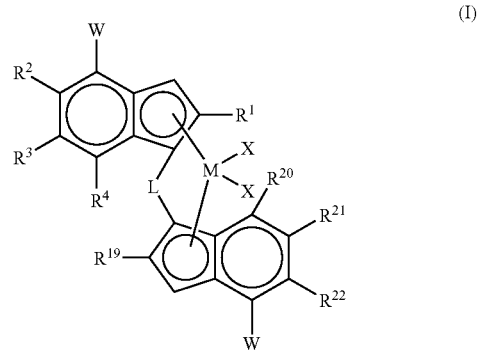

ii) an alumoxane or a compound capable of forming an alkyl metallocene cation; and optionally
iii) an organo aluminum compound;
step b) contacting, under polymerization conditions, in a gas phase, propylene or ethylene with one or more alpha olefins of formula $CH_2=CHT$, wherein T is hydrogen or a $C_1$-$C_{10}$ alkyl radical, and optionally a non-conjugated diene, in the presence of the polymer obtained in step a) and optionally in the presence of an additional organo aluminum compound; provided that an homopolymer is not produced;
wherein: the compound of formula (I) is described in the application.

27 Claims, No Drawings

U.S. PATENT DOCUMENTS

| | | |
|---|---|---|
| 6,953,829 B2 | 10/2005 | Kratzer et al. |
| 6,963,017 B2 | 11/2005 | Bingel et al. |
| 7,038,070 B2 | 5/2006 | Bingel et al. |
| 7,053,160 B1 | 5/2006 | Bingel et al. |
| 7,101,940 B2 | 9/2006 | Schottek et al. |
| 7,112,638 B2 | 9/2006 | Nifant'ev et al. |
| 7,141,527 B1 | 11/2006 | Van Baar et al. |
| 7,141,637 B2 | 11/2006 | Elder et al. |
| 7,314,903 B2 | 1/2008 | Resconi et al. |
| 2003/0149199 A1 | 8/2003 | Schottek et al. |
| 2004/0132612 A1 | 7/2004 | Resconi et al. |
| 2006/0020096 A1 | 1/2006 | Schottek et al. |
| 2006/0052553 A1 | 3/2006 | Resconi et al. |
| 2006/0235173 A1 | 10/2006 | Resconi |
| 2007/0155919 A1 | 7/2007 | Okumura et al. |
| 2007/0260023 A1 | 11/2007 | Jones et al. |
| 2007/0276095 A1 | 11/2007 | Resconi et al. |

FOREIGN PATENT DOCUMENTS

| | | |
|---|---|---|
| DE | 19962814 | 6/2001 |
| DE | 19962910 | 7/2001 |
| EP | 172961 | 3/1986 |
| EP | 576970 | 1/1994 |
| EP | 633272 | 1/1995 |
| EP | 775707 | 5/1997 |
| EP | 938491 | 9/1999 |
| GB | 1575894 | 10/1980 |
| JP | 4016851 | 1/1992 |
| JP | 4016853 | 1/1992 |
| JP | 4016854 | 1/1992 |
| JP | 4031868 | 2/1992 |
| WO | 91/02012 | 2/1991 |
| WO | 92/00333 | 1/1992 |
| WO | 95/32995 | 12/1995 |
| WO | 98/40331 | 9/1998 |
| WO | 99/21899 | 5/1999 |
| WO | 99/45043 | 9/1999 |
| WO | 00/31090 | 6/2000 |
| WO | 01/21674 | 3/2001 |
| WO | 01/44318 | 6/2001 |
| WO | 01/47939 | 7/2001 |
| WO | 01/48034 | 7/2001 |
| WO | 01/62764 | 8/2001 |
| WO | 02/102811 | 12/2002 |
| WO | 03/045964 | 6/2003 |
| WO | 03/050131 | 6/2003 |
| WO | 2004/005360 | 1/2004 |
| WO | 2004/050724 | 6/2004 |
| WO | 2004/099269 | 11/2004 |
| WO | 2005/023889 | 3/2005 |
| WO | 2005/058916 | 6/2005 |
| WO | 2005/095468 | 10/2005 |
| WO | 2005/095473 | 10/2005 |
| WO | 2005/095474 | 10/2005 |
| WO | 2005/118654 | 12/2005 |
| WO | 2006/097497 | 9/2006 |
| WO | 2006/097500 | 9/2006 |
| WO | 2006/100269 | 9/2006 |
| WO | 2006/117285 | 11/2006 |
| WO | 2006/120177 | 11/2006 |

OTHER PUBLICATIONS

M. Kakugo et al., "$^{13}$C NMR Determination of Monomer Sequence Distribution in Ethylene-Propylene Copolymers Prepared with $\delta$-TiCl$_3$-Al(C$_2$H$_5$)$_2$Cl," *Macromolecules*, vol. 15(4), p. 1150-1152 (1982).

A. Rossi et al., "End Groups in 1-Butene Polymerization via Methylaluminoxane and Zirconocene Catalyst," *Macromolecules*, vol. 28(6), p. 1739-1749 (1995).

N. Naga et al., "Effect of co-catalyst system on $\alpha$-olefin polymerization with *rac*- and *meso*- [dimethylsilylenebis(2,3,5-trimethyl-cyclopentadienyl)]zirconium dichloride," *Macromol. Rapid Commun.*, vol. 18, p. 581-589 (1997).

L. Resconi et al., "$C_1$-Symmetric Heterocyclic Zirconocenes as Catalysts for Propylene Polymerization, 2; *ansa*-Zirconocenes with Linked Dithienocyclopentadienyl-Substituted Indenyl Ligands," *Macromol. Chem. Phys.*, vol. 206, p. 1405-1438 (2005).

C. Cobzaru et al., "Novel High and Ultrahigh Molecular Weight Poly(propylene) Plastomers by Asymmetric Hafnocene Catalysts," *Macromol. Chem. Phys.*, vol. 206, p. 1231-1240 (2005).

L. Resconi et al., "Selectivity in Propene Polymerization with Metallocene Catalysts," *Chem. Rev.*, vol. 100(4), p. 1253-1345 (2000).

PROCESS FOR THE POLYMERIZATION OF OLEFINS

This application is the U.S. national phase of International Application PCT/EP2006/060941, filed Mar. 22, 2006, claiming priority to European Patent Application 05102348.9 filed Mar. 23, 2005, and the benefit under 35 U.S.C. 119(e) of U.S. Provisional Application No. 60/666,219, filed Mar. 29, 2005; the disclosures of International Application PCT/EP2006/060941, European Patent Application 05102348.9 and U.S. Provisional Application No. 60/666,219, each as filed, are incorporated herein by reference.

The present invention relates to a multistep process for preparing heterophasic propylene copolymers, by using a particular class of metallocene compounds.

Multistep processes for the polymerization of olefins, carried out in two or more reactors, are known from the patent literature and are of particular interest in industrial practice. The possibility of independently varying, in any reactors, process parameters such as temperature, pressure, type and concentration of monomers, concentration of hydrogen or other molecular weight regulator, provides much greater flexibility in controlling the composition and properties of the end product compared to single-step processes. Multistep processes are generally carried out using the same catalyst in the various steps/reactors. The product obtained in one reactor is discharged and sent directly to the next step/reactor without altering the nature of the catalyst. WO 01/48034 describes a class of bis indenyl metallocene compounds wherein the indenyl moieties are substituted in position 4 with a substituted aryl radical. This document exemplifies the use of this class of metallocene compounds in a multistage process.

PCT/EP2004/013827 relates to a class of bis indenyl metallocene compounds wherein at least one indenyl moiety is substituted in position 5 and 6 with a condensed ring. This documents describes in a generical way a process for preparing an heterophasic polymer. It describes only the polymers that can be prepared in each stage without explaining how each step has to be carried out. Moreover this document reports that the amount of copolymer produced in the second stage ranges from 3 to 60% by weight of the end product.

The applicant now surprisingly found that when a particular class of bis indenyl metallocene compounds is used for the preparation of an heterophasic polymer it is possible to achieve in high yield a polymer having an high molecular weight. In particular the rubber phase of the heterophasic polymer results to have a very high molecular weight. Moreover when the amount of the rubber exceeds a certain threshold it is possible to obtain a soft final polymer with an optimum balance of properties.

Therefore an object of the present invention is a multistep process comprising the following steps:

step a) polymerizing propylene and optionally one or more monomers selected from ethylene or alpha olefins of formula $CH_2$=$CHT^1$, wherein $T^1$ is a $C_2$-$C_{10}$ alkyl radical in the presence of a catalyst system comprising:

i) one or more metallocene compounds of formula (I):

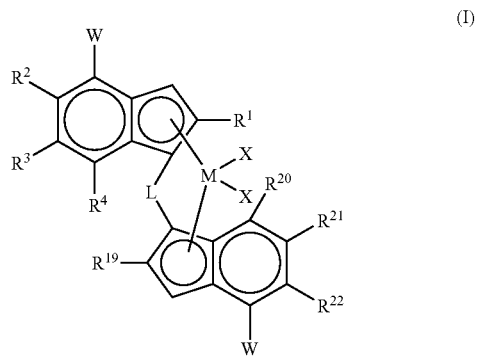

ii) an alumoxane or a compound capable of forming an alkyl metallocene cation; and optionally
iii) an organo aluminum compound;

step b) contacting, under polymerization conditions, propylene or ethylene with one or more alpha olefins of formula $CH_2$=$CHT$, wherein T is hydrogen or a $C_1$-$C_{10}$ alkyl radical, and optionally a non-conjugated diene, in the presence of the polymer obtained in step a) and optionally in the presence of an additional organo aluminum compound; provided that an homopolymer is not produced;
wherein the amount of the polymer obtained in step a) ranges from 5% by weight to 39% by weight of the polymer obtained in the whole process and the amount of polymer obtained in step b) ranges from 61% by weight to 95% by weight of the polymer obtained in the whole process;

wherein: in the compound of formula (I):

M is an atom of a transition metal selected from those belonging to group 4 of the Periodic Table of the Elements; preferably M is zirconium, titanium or hafnium;

X, equal to or different from each other, is a hydrogen atom, a halogen atom, a R, OR, OR'O, $OSO_2CF_3$, OCOR, SR, $NR_2$ or $PR_2$ group wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; and R' is a $C_1$-$C_{20}$-alkylidene, $C_6$-$C_{20}$-arylidene, $C_7$-$C_{20}$-alkylarylidene, or $C_7$-$C_{20}$-arylalkylidene radical; preferably X is a hydrogen atom, a halogen atom, a OR'O or R group; more preferably X is chlorine or a methyl radical;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or a $C_7$-$C_{20}$ arylalkylidene radicals, optionally containing heteroatoms belonging to groups 13-17 of the Periodic Table of the Elements, or it is a silylidene radical containing up to 5 silicon atoms; preferably L is $Si(R^{11})_2$ wherein $R^{11}$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; more preferably L is $Si(CH_3)_2$ or $SiPh_2$;

$R^1$ and $R^{19}$ are different from each other and are a $Z^{1'}$ or $Z^{2'}$ group wherein $Z^{1'}$ is an alpha branched $C_1$-$C_{20}$ hydrocarbon radical optionally containing heteroatoms belonging to groups 13-17 of the Periodic Table of the Elements, and $Z^{2'}$ is a linear $C_1$-$C_{40}$ hydrocarbon radical optionally containing heteroatoms belonging to groups 13-17 of the Periodic Table of the Elements; with the proviso that if $R^1$ or $R^{19}$ are $Z^{1'}$ then $R^{19}$ or $R^1$ are $Z^{2'}$; preferably $Z^{1'}$ is a compound of formula of formula (II)

or an alpha branched aryl or arylalkyl radical containing from 2 to 20 carbon atoms optionally containing O, N, S, P and Se atoms, in particular O, N and S atoms such as 2(5-Methiophenyl) or 2(5-Me-furanyl) radicals;

wherein in the compound of formula (II) $R^{23}$ and $R^{24}$, equal to or different from each other, are $C_1$-$C_{40}$ hydrocarbon radicals optionally containing heteroatoms belonging to groups 13-17 of the Periodic Table of the Elements; preferably they are $C_1$-$C_{20}$ hydrocarbon radicals optionally containing heteroatoms belonging to groups 13-17 of the Periodic Table of the Elements; more preferably $R^{23}$ and $R^{24}$ are $C_1$-$C_{20}$-alkyl, $C_2$-$C_{40}$ alkenyl, preferably $C_2$-$C_{20}$ alkenyl, $C_2$-$C_{40}$ alkynyl, preferably $C_2$-$C_{20}$ alkynyl radicals, optionally containing heteroatoms belonging to groups 13-17 of the Periodic Table of the Elements; more preferably $R^{23}$ and $R^{24}$ are linear or branched $C_1$-$C_{10}$-alkyl radical such as methyl, or ethyl radicals; $R^{25}$ is an hydrogen atom or it has the same meaning of $R^{23}$ and $R^{24}$; more preferably $R^{25}$ is a hydrogen atom;

preferably $Z^{2'}$ is a linear $C_1$-$C_{20}$-alkyl, $C_2$-$C_{40}$ alkenyl, $C_2$-$C_{40}$ alkynyl radical, optionally containing heteroatoms belonging to groups 13-17 of the Periodic Table of the Elements;

preferably $Z^{2'}$ is a linear $C_1$-$C_{10}$-alkyl radical; more preferably $Z^{2'}$ is a methyl, or ethyl radical;

$R^2$ and $R^3$, are part of 4-7 membered ring condensed to the benzene ring of the indenyl moiety;

preferably a 5 or 6 membered ring; said ring optionally containing heteroatoms belonging to groups 13-16 of the Periodic Table of the Elements preferably groups 15-16 of the Periodic Table of the Elements; the valence of each atom forming said ring being substituted with $R^{18}$ radicals; that means that is filled with $R^{18}$ groups, wherein $R^{18}$, equal to or different from each other, are hydrogen atoms or a $C_1$-$C_{40}$ hydrocarbon radical; preferably $R^{18}$ is a hydrogen atom or a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical, optionally containing one or more heteroatoms belonging to groups 13-17 of the Periodic Table of the Elements; more preferably $R^{18}$ is a hydrogen atom or a linear or branched, $C_1$-$C_{20}$-alkyl radical; more preferably $R^{18}$ is a hydrogen atom or a methyl or ethyl radical; said ring can be saturated or it can contain double bonds; preferably $R^2$ and $R^3$, form together a condensed saturated 3-7 membered ring;

$R^4$ is a hydrogen atom or a $C_1$-$C_{40}$ hydrocarbon radical optionally containing heteroatoms belonging to groups 13-17 of the Periodic Table of the Elements; preferably $R^4$ is a hydrogen atom or a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical optionally containing heteroatoms belonging to groups 13-17 of the Periodic Table of the Elements; preferably $R^4$ is a hydrogen atom a $C_1$-$C_{10}$-alkyl or a $C_6$-$C_{40}$-aryl radical;

W is an aromatic 5 or 6 membered ring that can contain heteroatoms belonging to groups 15-16 of the Periodic Table of the Elements; the valence of each atom of said ring is substituted with hydrogen atom or it can optionally be substituted with $R^5$ groups, wherein $R^5$, equal to or different from each other, are $C_1$-$C_{40}$ hydrocarbon radicals optionally containing heteroatoms belonging to groups 13-17 of the Periodic Table of the Elements; preferably $R^5$, are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements;

Preferably W is selected from the group comprising the following moieties of formula (Wa), (Wb) and (Wc):

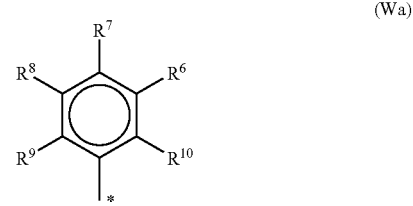

wherein the * represents the point in which the moiety bounds the indenyl moiety of the compound of formula (I);

$R^6$, $R^7$, $R^8$, $R^9$ and $R^{10}$, equal to or different from each other, are hydrogen atoms or $C_1$-$C_{40}$ hydrocarbon radicals optionally containing heteroatoms belonging to groups 13-17 of the Periodic Table of the Elements; preferably $R^6$, $R^7$, $R^8$, $R^9$ and $R^{10}$, are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements;

$Z^1$ is a nitrogen atom or a $CR^{10}$ group; $Z^2$ is a nitrogen atom or a $CR^6$ group; $Z^3$ is a nitrogen atom or a $CR^7$ group; $Z^4$ is a nitrogen atom or a $CR^8$ group; $Z^5$ is a nitrogen atom or a $CR^9$ group; provided that not more that 2 groups among $Z^1$, $Z^2$, $Z^3$, $Z^4$ and a $Z^5$ are nitrogen atoms, preferably not more that one group among $Z^1$, $Z^2$, $Z^3$, $Z^4$ and $Z^5$ is a nitrogen atom;

$Z^6$ is an oxygen atom, a sulfur atom, a $NR^{13}$ group or a $CR^{13}$ group; $Z^7$ is an oxygen atom, a sulfur atom, a $NR^{14}$ group or a $CR^{14}$ group; $Z^8$ is an oxygen atom, a sulfur atom, a $NR^{15}$ group or a $CR^{15}$ group; $Z^9$ is an oxygen atom, a sulfur atom, a $NR^{16}$ group or a $CR^{16}$ group;

$Z^{10}$ is a nitrogen atom or a carbon atom that bonds the indenyl moiety of the structure of formula (I); with the proviso that not more than 1 group among $Z^6$, $Z^7$, $Z^8$, $Z^9$ or $Z^{10}$ is a sulfur atom, an oxygen atom or a nitrogen-containing group atom selected from $NR^{13}$, $NR^{14}$, $NR^{15}$, $NR^{16}$, and a nitrogen atom;

$R^{13}$, $R^{14}$, $R^{15}$, and $R^{16}$, equal to or different from each other, are hydrogen atoms or $C_1$-$C_{40}$ hydrocarbon radicals optionally containing heteroatoms belonging to groups 13-17 of the Periodic Table of the Elements; preferably $R^6$, $R^7$, $R^8$, $R^9$ and $R^{10}$, are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals optionally containing heteroatoms belonging to groups 13-17 of the Periodic Table of the Elements; more preferably $R^6$, $R^7$, $R^8$, $R^9$ and $R^{10}$ are hydrogen atoms, $C_1$-$C_{40}$-alkyl or $C_6$-$C_{40}$-aryl radicals;

In the moiety of formula (Wa), in a preferred embodiment, $R^7$ is a $C_1$-$C_{40}$-alkyl radical, preferably a branched $C_1$-$C_{40}$-alkyl radical such as a tertbutyl radical, more preferably $R^7$ is a branched $C_1$-$C_{40}$-alkyl radical wherein the carbon atom in position alpha is a tertiary carbon atom and $R^6$, $R^8$, $R^9$ and $R^{10}$ are hydrogen atoms;

In a further preferred embodiment $R^{10}$ and $R^8$ are $C_1$-$C_{40}$-alkyl radicals, preferably they are linear $C_1$-$C_{40}$ alkyl radicals such as methyl radicals and $R^7$, $R^8$ and $R^9$ are hydrogen radicals:

In a further preferred embodiment $R^6$, $R^7$ and $R^8$ are linear or branched $C_1$-$C_{40}$-alkyl radicals such as methyl or tertbutyl radicals and $R^{10}$ and $R^9$ are hydrogen atoms.

In a further preferred embodiment $R^6$, $R^7$, $R^8$, $R^9$ and $R^{10}$ are hydrogen atoms;

In the moiety of formula (Wb), in a preferred embodiment, $Z^1$ is a nitrogen atom and $Z^2$, $Z^3$, $Z^4$ and $Z^5$ are respectively $CR^6$, $CR^7$, $CR^8$ and $CR^9$ wherein the meaning of $R^6$, $R^7$, $R^8$, and $R^9$ is described above; in a further preferred embodiment $Z^3$ is a nitrogen atom and $Z^1$, $Z^2$, $Z^4$ and $Z^5$ are respectively $CR^{10}$, $CR^6$, $CR^8$ and $CR^9$ wherein the meaning of $R^{10}$, $R^6$, $R^8$, and $R^9$ is described above; in a further preferred embodiment $Z^2$ is a nitrogen atom and $Z^1$, $Z^3$, $Z^4$ and $Z^5$ are respectively $CR^{10}$, $CR^7$, $CR^8$ and $CR^9$ wherein the meaning of $R^{10}$, $R^7$, $R^8$, and $R^9$ is described above;

In the moiety of formula (Wc) in a preferred embodiment $Z^6$ is an oxygen atom, a sulfur atom, a $NR^{16}$ group; preferably it is a sulfur atom or a $NR^{16}$; wherein $R^{16}$ is preferably a $C_1$-$C_{40}$-alkyl radical; more preferably $Z^6$ is a sulfur atom; and $Z^7$, $Z^8$, $Z^9$ and $Z^{10}$ are respectively a $CR^{14}$, $CR^{15}$, $CR^{16}$ and a carbon atom, wherein $R^{14}$ is a hydrogen atom or a $C_1$-$C_{40}$-alkyl radical such as methyl or ethyl; and $R^{15}$ and $R^{16}$ are hydrogen atoms or $C_1$-$C_{40}$-alkyl radicals;

$R^{20}$, $R^{21}$ and $R^{22}$, equal to or different from each other, are hydrogen atoms or $C_1$-$C_{40}$ hydrocarbon radicals optionally containing heteroatoms belonging to groups 13-17 of the Periodic Table of the Elements; preferably $R^{20}$ and $R^{21}$ are hydrogen atoms or $C_1$-$C_{10}$ alkyl radicals, with the proviso that they are not both $C_1$-$C_{10}$ alkyl radicals; preferably $R^{22}$ is an hydrogen atom;

Preferred class of compounds of formula (I) have formula (III)

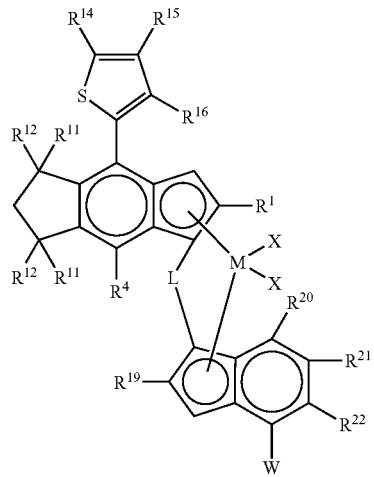

(III)

Wherein M, L, X, $R^1$, $R^4$, $R^{14}$, $R^{15}$, $R^{16}$, $R^{19}$, $R^{20}$, $R^{21}$, $R^{22}$ and have the meaning reported above and $R^{11}$ and $R^{12}$, equal to or different from each other, are hydrogen atoms or $C_1$-$C_{40}$ hydrocarbon radicals optionally containing heteroatoms belonging to groups 13-17 of the Periodic Table of the Elements; preferably $R^{11}$ and $R^{12}$ are hydrogen atoms or linear or branched, cyclic or acyclic, $C_1$-$C_{40}$-alkyl, $C_2$-$C_{40}$ alkenyl, $C_2$-$C_{40}$ alkynyl radicals, optionally containing heteroatoms belonging to groups 13-17 of the Periodic Table of the Elements; more preferably $R^{11}$ and $R^{12}$ are hydrogen atoms or $C_1$-$C_{20}$-alkyl radicals such as methyl or ethyl radicals.

A further preferred class of compounds of formula (I) have formula (IV)

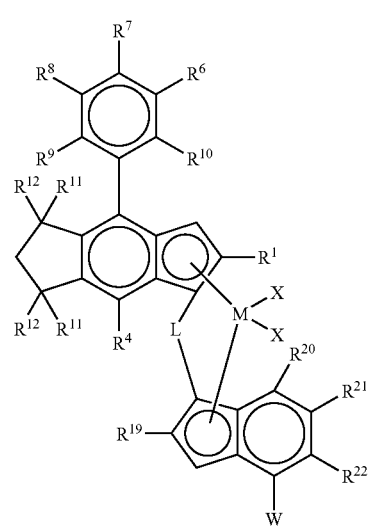

(IV)

Wherein M, L, X, $R^1$, $R^4$, $R^6$, $R^7$, $R^8$, $R^9$, $R^{10}$, $R^{19}$, $R^{20}$, $R^{21}$, $R^{22}$ and W have the meaning reported above and $R^{11}$ and $R^{12}$, equal to or different from each other, are hydrogen atoms or $C_1$-$C_{40}$ hydrocarbon radicals optionally containing heteroatoms belonging to groups 13-17 of the Periodic Table of the Elements; preferably $R^{11}$ and $R^{12}$ are hydrogen atoms or linear or branched, cyclic or acyclic, $C_1$-$C_{20}$-alkyl, $C_2$-$C_{40}$ alkenyl, $C_2$-$C_{40}$ alkynyl radicals, optionally containing heteroatoms belonging to groups 13-17 of the Periodic Table of the Elements; more preferably $R^{11}$ and $R^{12}$ are hydrogen atoms or $C_1$-$C_{10}$-alkyl radicals such as methyl or ethyl radicals; Preferably W is a moiety of formula (Wa) as described above.

Compounds of formula (I) can be prepared according to PCT/EP2004/013827.

Alumoxanes used as component ii) in the catalyst system according to the present invention can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the catalyst system according to the invention are considered to be linear, branched or cyclic compounds containing at least one group of the type:

wherein the substituents U, same or different, are defined above.

In particular, alumoxanes of the formula:

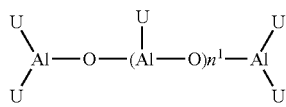

can be used in the case of linear compounds, wherein $n^1$ is 0 or an integer of from 1 to 40 and the substituents U are defined as above; or alumoxanes of the formula:

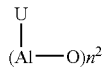

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns. Non-limiting examples of aluminium compounds that can be reacted with water to give suitable alumoxanes (b), described in WO 99/21899 and WO01/21674, are: tris(2,3,3-trimethyl-butyl) aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl) aluminium, tris(2-ethyl-3,3-dimethyl-butyl)aluminium, tris (2-ethyl-3,3-dimethyl-pentyl)aluminium, tris(2-isopropyl-3,3-dimethyl-butyl)aluminium, tris(2-trimethylsilyl-propyl) aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chlorophenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl) aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Tributylammoniumtetra(pentafluorophenyl)aluminate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate, N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylcarbeniumtetrakis(pentafluorophenyl)borate,
Triphenylcarbeniumtetrakis(pentafluorophenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

Organic aluminum compounds used as compound iii) are those of formula $H_jAlU_{3-j}$ or $H_jAl_2U_{6-j}$ as described above.

The catalysts system to be used in the process of the present invention can be supported on an inert carrier. This is achieved by depositing the metallocene compound i) or the product of the reaction thereof with the component ii), or the component ii) and then the metallocene compound i) on an inert support. The support can be a porous solid such as talc, a sheet silicate, an inorganic oxide or a finely divided polymer powder (e.g. polyolefin). Suitable inorganic oxides may be found among the oxides of elements of groups 2, 3, 4, 5, 13, 14, 15 and 16 of the Periodic Table of the Elements. Examples of oxides preferred as supports include silicon dioxide, aluminum oxide, and also mixed oxides of the elements calcium, aluminum, silicon, magnesium or titanium and also corresponding oxide mixtures, magnesium halides, styrene/divinylbenzene copolymers, polyethylene or polypropylene. Other inorganic oxides which can be used alone or in combination with the abovementioned preferred oxidic supports are, for example, MgO, $ZrO_2$, $TiO_2$ or $B_2O_3$.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633 272.

Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The support materials used preferably have a specific surface area in the range from 10 to 1 000 $m^2$/g, a pore volume in the range from 0.1 to 5 ml/g and a mean particle size of from 1 to 500 µm. Preference is given to supports having a specific surface area in the range from 50 to 500 $m^2$/g, a pore volume in the range from 0.5 to 3.5 ml/g and a mean particle size in the range from 5 to 350 µm. Particular preference is given to supports having a specific surface area in the range from 200 to 400 $m^2$/g, a pore volume in the range from 0.8 to 3.0 ml/g and a mean particle size of from 10 to 300 µm.

The inorganic support can be subjected to a thermal treatment, e.g. to remove adsorbed water. Such a drying treatment is generally carried out at from 80 to 300° C., preferably from 100 to 200° C., with drying at from 100 to 200° C. preferably being carried out under reduced pressure and/or a blanket of inert gas (e.g. nitrogen), or the inorganic support can be calcined at from 200 to 1000° C. to produce the desired structure of the solid and/or set the desired OH concentration on the surface. The support can also be treated chemically using customary desiccants such as metal alkyls, preferably aluminum alkyls, chlorosilanes or $SiCl_4$, or else methylaluminoxane. Appropriate treatment methods are described, for example, in WO 00/31090.

The inorganic support material can also be chemically modified. For example, treatment of silica gel with $(NH_4)_2SiF_6$ leads to fluorination of the silica gel surface, or treatment of silica gels with silanes containing nitrogen-, fluorine- or sulfur-containing groups leads to correspondingly modified silica gel surfaces.

Organic support materials such as finely divided polyolefin powders (e.g. polyethylene, polypropylene or polystyrene) can also be used and are preferably likewise freed of adhering moisture, solvent residues or other impurities by means of appropriate purification and drying operations before use. It is also possible to use functionalized polymer supports, e.g. supports based on polystyrene, via whose functional groups, for example ammonium or hydroxy groups, at least one of the catalyst components can be immobilized. The solid compound obtained by supporting the catalyst system object of the present invention on a carrier in combination with the further addition of the alkylaluminium compound either as such or prereacted with water if necessary, can be usefully.

Preferably step a) further comprises a prepolymerization step a-1).

The prepolymerization step a-1) can be carried out by contacting the catalyst system with ethylene propylene or one or more alpha olefins of formula $CH_2=CHT^1$, wherein $T^1$ is a $C_2$-$C_{20}$ alkyl radical. Preferably said alpha olefins are propylene or ethylene, at a temperature ranging from –20° C. to 70° C., in order to obtain a prepolymerized catalyst system preferably containing from 5 to 500 g of polymer per gram of catalyst system.

Thus preferably step a) comprises a-1) contacting the catalyst system described above with ethylene and/or propylene and/or one or more alpha olefins of formula $CH_2=CHT^1$, wherein $T^1$ is a $C_2$-$C_{20}$ alkyl radical; preferably propylene or ethylene. in order to obtain a prepolymerized catalyst system preferably containing from 5 to 500 g of polymer per gram of catalyst system;

a-2) polymerizing propylene and optionally one or more monomers selected from ethylene and alpha olefins of formula $CH_2=CHT^1$, wherein $T^1$ is a $C_2$-$C_{20}$ alkyl radical in the presence of the prepolymerized catalyst system obtained in step a-1).

Step a) of the present invention can be carried out in liquid phase, in which the polymerization medium can be an inert hydrocarbon solvent or the polymerization medium can be liquid propylene optionally in the presence of an inert hydrocarbon solvent, and of ethylene or one or more comonomer of formula $CH_2=CHT^1$, or step a) can be carried out in a gas phase. Said hydrocarbon solvent can be either aromatic (such as toluene) or aliphatic (such as propane, hexane, heptane, isobutane, cyclohexane and 2,2,4-trimethylpentane).

Preferably the polymerization medium is liquid propylene. It can optionally contain minor amounts (up to 40% by weight, preferably up to 20% by weight, more preferably up to 5% by weight) of an inert hydrocarbon solvent or of one or more comonomer such as ethylene or alpha-olefins of formula $CH_2=CHT^1$.

Step a) can be carried out in the presence of hydrogen. The ratio hydrogen/propylene present during the polymerization reaction is preferably higher than 1 ppm; more preferably it ranges from 5 to 2000 ppm; even more preferably from 6 to 500 ppm with respect to the propylene present in the reactor. Hydrogen can be added either at the beginning of the polymerization reaction or it can also be added at a later stage after a prepolymerization step has been carried out. The propylene polymer obtained in step a) is a propylene homopolymer or a propylene copolymer containing up to 20% by mol preferably from 0.1 to 10% by mol, more preferably from 1% to 5% by mol of derived units of ethylene or one or more alpha olefins of formula $CH_2=CHT^1$. Non-limiting examples of alpha olefins of formula $CH_2=CHT^1$ which can be used in the process of the invention are 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-octadecene and 1-eicosene. Preferred comonomers are ethylene or 1-butene.

The amount of polymer obtained in step a) ranges from 5% to 39% by weight of the total polymer produced in the whole process, preferably it ranges from 10% to 38% by weight of the total polymer produced in the whole process; more preferably from 20% to 35% by weight of the total polymer produced in the whole process.

Preferably in step a) a propylene homopolymer or a propylene/ethylene copolymer having an ethylene content lower than 10% by weight is prepared.

Step b) of the present invention can be carried out in liquid phase, in which the polymerization medium can be an inert hydrocarbon solvent or the polymerization medium can be liquid propylene or ethylene optionally in the presence of an inert hydrocarbon solvent, and of ethylene or one or more comonomer of formula $CH_2=CHT$, or step b) can be carried out in a gas phase. Said hydrocarbon solvent can be either aromatic (such as toluene) or aliphatic (such as propane, hexane, heptane, isobutane, cyclohexane and 2,2,4-trimethylpentane).

The polymerization temperature is generally comprised between −100° C. and +200° C., and, preferably, between 10° C. and +100° C. The polymerization pressure is generally comprised between 0.5 and 100 bar. The amount of polymer obtained in step b) ranges from 61% to 95% by weight of the polymer produced in the whole process, preferably it ranges from 62% to 90% by weight of the polymer produced in the whole process, more preferably it ranges from 65% to 80% by weight of the polymer produced in the whole process.

Step b) can be carried out in the presence of hydrogen. The ratio hydrogen/hethylene present during the polymerization reaction is preferably higher than 1 ppm with respect to the ethylene or propylene, depending on what is the prevalent monomer, present in the reactor; more preferably it ranges from 5 to 2000 ppm; even more preferably from 6 to 500 ppm.

In step b) an ethylene or propylene copolymer having from 4% by mol to 90% by mol, preferably from 15% by mol to 60% by mol of derived units of comonomers of formula $CH_2=CHT$ and optionally up to 20% of derived units of non conjugated diene, is produced. Examples of comonomer of formula $CH_2=CHT$ that can be used in step b) of the present invention other then propylene and ethylene are: 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-octadecene and 1-eicosene.

In step b) of the present invention a propylene copolymer or an ethylene copolymer can be produced. In case a propylene copolymer is produced, propylene is copolymerized with an alpha olefins of formula $CH_2=CHT$, wherein T is hydrogen or a $C_1-C_{10}$ alkyl radical, and optionally a non-conjugated diene, in the presence of the polymer obtained in step a) and optionally in the presence of an additional organo aluminum compound; provided that an homopolymer is not produced; examples of suitable comonomers of formula $CH_2=CHT$ are reported above; preferred comonomer to be used with propylene are ethylene, 1-butene and 1-hexene.

In case an ethylene copolymer is produced ethylene is copolymerized with an alpha olefins of formula $CH_2=CHT$, wherein T is hydrogen or a $C_1-C_{10}$ alkyl radical, and optionally a non-conjugated diene, in the presence of the polymer obtained in step a) and optionally in the presence of an additional organo aluminum compound; provided that an homopolymer is not produced; examples of suitable comonomers of formula $CH_2=CHT$ are reported above; preferred comonomer to be used with ethylene are 1-butene and 1-hexene.

The polymer obtained in step b) can optionally contains up to 20% by mol of a non conjugated diene. Non conjugated dienes can be a straight chain, branched chain or cyclic hydrocarbon diene having from 6 to 20 carbon atoms. Examples of suitable non-conjugated dienes are:

straight chain acyclic dienes, such as 1,4-hexadiene and 1,6-octadiene;

branched chain acyclic dienes, such as 5-methyl-1,4-hexadiene, 3,7-dimethyl-1,6-octadiene, 3,7-dimethyl-1,7-octadiene and mixed isomers of dihydro myricene and dihydroocinene;

single ring alicyclic dienes, such as 1,3-cyclopentadiene, 1,4-cyclohexadiene, 1,5-cyclooctadiene and 1,5-cyclododecadiene;

multi-ring alicyclic fused and bridged ring dienes, such as tetrahydroindene, methyl tetrahydroindene, dicyclopentadiene, bicyclo-(2,2,1)-hepta-2,5-diene; and alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

Preferred dienes are 1,4-hexadiene (HD), 5-ethylidene-2-norbornene (ENB), 5-vinylidene-2-norbornene (VNB), 5-methylene-2-norbornene (MNB) and dicyclopentadiene (DCPD). Particularly preferred dienes are 5-ethylidene-2-norbornene (ENB) and 1,4-hexadiene (HD).

When present the non-conjugated dienes are generally incorporated into the polymer in an amount from 0.1% to about 20% by mol; preferably from 1% to 15% by mol, and more preferably from 2% to 7% by mol. If desired, more than one diene may be incorporated simultaneously, for example HD and ENB, with total diene incorporation within the limits specified above.

The process of the present invention can be carried out in one reactor or in two or more reactor in series. Each step (step a and b) can be carried out in slurry, solution or in a gas phase; preferably step a is carried out in slurry or in a gas phaseL; preferably step b) can be carried out in slurry or in a gas phase. However it is also possible that both steps are carried out in solution.

The following examples have an illustrative a non limiting purpose

EXAMPLES

General Characterization

Intrinsic Viscosity (IV) in Decahydronaphthalene

The intrinsic viscosity in Decahydronaphthalene (DHN) was determined on an Ubbelohde viscometer PVS 1 with an S 5 measuring head (both from Lauda) in decalin at 135° C. To prepare the sample, 20 mg of polymer were dissolved in 20 ml of decalin at 135° C. over a period of 2 hours. 15 ml of the solution were placed in the viscometer; the instrument carried out a minimum of three running-out time measurements until a consistent result had been obtained. The IV was calculated from the running-out times according to IV=(t/t0−1)*1/c where t: mean of the running-out time of the solution, t0: mean of the running-out time of the solvent, c: concentration of the solution in g/ml.

Intrinsic Viscosity (IV) in Tetrahydronaphthalene

The measurement for examples 1-5 were done in tetrahydronaphthalene (THN) solution obtained by dissolving the polymer at 135° C. for 1 hour.

Xylene Soluble Fraction at 25° C.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer.

Melting Temperature Tm

Calorimetric measurements were performed by using a differential scanning calorimeter DSC Mettler. The instrument is calibrated with indium and tin standards. The weighted sample (5-10 mg), was sealed into aluminum pans, heated to 200° C. and kept at that temperature for a time long enough (5 minutes) to allow a complete melting of all the crystallites. Successively, after cooling at 20° C./min to −20° C. After standing 5 minutes at 0° C., the sample was heated to 200° C. at a rate of 20° C./min. In this second heating run, the peak temperature was assumed as melting temperature (Tm) and the area as the global melting hentalpy (ΔH).

Gel Permeation Chromatography

Gel permeation chromatography (GPC) was carried out at 145° C. in 1,2,4-trichlorobenzene using a GPC apparatus 150C from Waters. The data were evaluated using the software Win-GPC from HS-Entwicklungsgesellschaft fürwissenschaftliche Hard- und Software mbH, Ober-Hilbersheim. The calibration of the columns was carried out by means of polypropylene standards having molar masses of from 100 to 107 g/mol. Mass average molar masses (Mw) and number average molar masses (Mn) of the polymers were determined. The Q value is the ratio of mass average (Mw) to number average (Mn).

Chemicals and Characterization.

All chemicals were handled using standard Schlenk techniques.

Methylalumoxane (MAO) was received from Albemarle as a 30% wt/V toluene solution and used as such and the silica was received from INEOS (ES70Y, 100 microns).

Pseudo rac Dimethylsilanediyl-(6-methyl-4-(4'-tert-butylphenyl)-1,2,3,5-tetrahydro-s-indacen-7-yl)(2-isopropyl-4-(4'-tert-butylphenyl)-1-indenyl)-zirconium dichloride (C-1) was synthesized according to PCT/EP2004/013827.

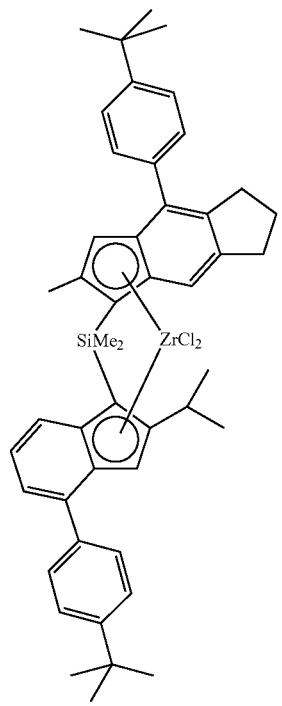

Pseudo rac Dimethylsilanediyl-(6-methyl-4-phenyl-1,2,3,5-tetrahydro-s-indacen-7-yl)-(2-isopropyl-4-(4'-tert-butylphenyl)-1-indenyl)-zirconium dichloride (C-2)

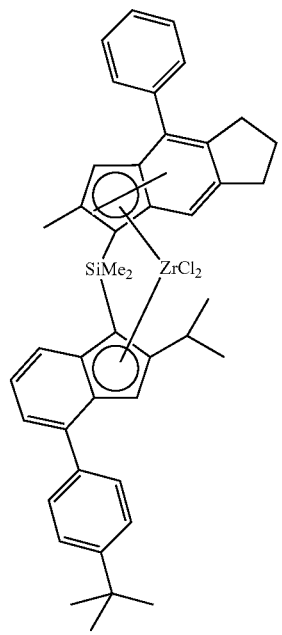

was synthesized according to PCT/EP2004/013827.

rac-dimethylsilanediyl(2-methyl-4-(4'-tert-butylphenyl)indenyl)(2-isopropyl-4-(4'-tetr-butylphenyl)indenyl)zirconium dichloride (C-3)

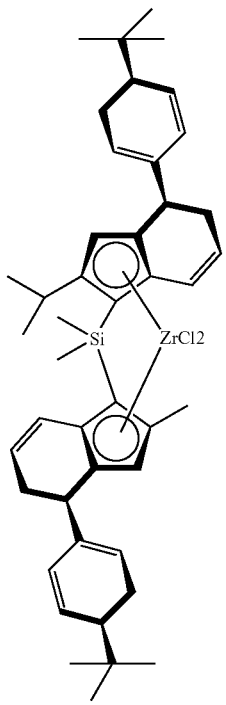

was prepared according to the procedure described in WO 01/48034.

Preparation of Supported Catalyst System 6.3 g SiO$_2$ are placed in a round flask equipped with a KPG stirrer and suspended at 0° C. in 30 ml toluene. Via a dropping funnel 15.1 ml MAO are slowly added at 0° C. After addition, the suspension is allowed to come to room temperature (RT), and is then stirred for 2 h. The reaction mixture is placed in a stirred glass flask equipped with filter (size P3), where the solvent is filtered off. The residual is suspended in 20 ml toluene, stirred for 15 min at room temperature, and filtered. The support is suspended in 20 ml toluene, then brought to 80° C., and stirred for 30 min at this temperature before hot filtration. Again, the support is suspended in 20 ml toluene, then brought to 80° C., and stirred for 30 min at this temperature before hot filtration. The MAO/silica is suspended at 15° C. in 20 ml toluene. Under stirring, a solution of 0.25 mmol (207 mg, 40 μmmol/g carrier) of the metallocene indicated in table 1 in 2 ml MAO and 2 ml toluene is slowly added. The reaction mixture is stirred for 1 h at 15° C., and after raising the temperature to 40° C., again stirred for 2 h. Then, it is filtered. The residual solid is washed 3 times at 60° C. with 20 ml toluene each (stirring: 3×30 min). After the last filtration, the reaction product is transferred with some toluene into a glass frit (size P3), and filtered again. The catalyst is transfer after drying at RT in high vacuum until weight constant.

Polymerization Examples 1-3

Multistep Polymerization

Step a)

A 2.5 L autoclave, previously kept overnight under nitrogen purge, is added with 2 mmol Triethylaluminum (TEA) (as 10% w/v hexane solution) as reactor scavenger. Also 0.5 bar-g of propylene are fed to prevent air insertion in the reactor.

Prepolymerization: 252 g propylene are fed in the autoclave at 0° C. The catalytic system is injected in the reactor and propylene is prepolymerized at 30° C. for 5 minutes. At the end of this step the reactor temperature was raised from 30 to 70° C. (in 10 minutes). During the temperature increase also 59 cc H$_2$ are fed, corresponding to 2.63 mmol H$_2$.

Propylene polymerization in bulk this step is carried out at 30 bar-g pressure and 70° C. until the liquid propylene is totally consumed, and the pressure inside the reactor starts to decrease. When this step is completed, the PP matrix polymerization time is recorded and the pressure is released down to 0.1 bar-g propylene; at the same time the temperature decreases to 30° C.

Step b)

Ethylene and propylene at a molar ratio ethylene(C2)/propylene(C3)+ethylene(C2) of 0.5 are fed in the reactor to reach the pressure of 21 bar-g then the temperature is raised to 60° C. and the ethylene/propylene mixture is fed at constant pressure until 232 g of monomers are consumed.

Then the reactor is vented and cooled down to room temperature; thus, the reaction is stopped. The polymer is collected and dried at reduced pressure and 60° C.

The resulting polymer has been subjected to xylene extraction at 25° C. according to the procedure described above. The fraction of polymer soluble in xylene at 25° C. has been taken as the amount of ethylene propylene copolymers produced in the process. The polymerization data are reported in table 1.

| Ex | Met | Met mg | Step a) Activity Kg PP/g catalyst/hour | Step b) Activity Kg EPR/g catalyst/hour | C2$_{EPR}$ % wt | X.S. % wt | IV xs dl/g THN | Tm C. ° |
|---|---|---|---|---|---|---|---|---|
| 1 | C-2 | 118 | 1.3 | 2.9 | 23.8 | 66.6 | 2.06 | 155.7 |
| 2 | C-1 | 120 | 2.4 | 4.0 | 25.4 | 65.3 | 1.75 | 156.1 |
| 3* | C-3 | 380 | 0.75 | 2.5 | 22.0 | 62.3 | 1.26 | 152.0 |

*comparative
EPR propylene ethylene polymer

Polymerization Example 4

Multistep Polymerization

Step a)

A 2.5 L autoclave, previously kept overnight under nitrogen purge, is added with 2 mmol Triethylaluminum (TEA) (as 10% w/v hexane solution) as reactor scavenger. Also 0.5 bar-g of propylene are fed to prevent air insertion in the reactor.

Prepolymerization: 134 g propylene are fed in the autoclave at 0° C. The catalytic system is injected in the reactor and propylene is prepolymerized at 30° C. for 5 minutes. At the end of this step the reactor temperature was raised from 30 to 80° C. (in 10 minutes). Propylene polymerization in gas phase: this step is carried out at 24 bar-g pressure and 80° C. until 70 grams of propylene are consumed and the pressure inside the reactor starts to decrease. When this step is completed, the PP matrix polymerization time is recorded and the pressure is released down to 0.1 bar-g propylene; at the same time the temperature decreases to 30° C.

Step b) Ethylene and propylene are fed in the reactor at a molar ratio (ethylene (propylene+ethylene)) of 0.3 and the temperature is raised to reach the pressure of 21 bar-g and the temperature of 70° C. Then the ethylene/propylene mixture is fed at constant pressure until 232 g of monomers are consumed.

Then the reactor is vented and cooled down to room temperature; thus, the reaction is stopped. The polymer is collected and dried at reduced pressure and temperature.

The results are reported in table 2

TABLE 2

| Ex | Met | Met mg | Step a) Activity Kg PP/g catalyst/ hour | Step b) Activity Kg EPR/g catalyst/ hour | $C2_{EPR}$ % wt | X.S. % wt | IV X.S. THN | Tm C. ° |
|---|---|---|---|---|---|---|---|---|
| 4 | C-2 | 124 | 0.9 | 3.0 | 12.6 | 67.1 | 2.1 | n.a. |

EPR propylene ethylene polymer

The invention claimed is:

1. A multistep process comprising the following steps:
step a) polymerizing propylene and optionally at least one monomer selected from ethylene or alpha olefins of formula $CH_2=CHT^1$, wherein $T^1$ is a $C_2$-$C_{10}$ alkyl radical, in the presence of a catalyst system comprising:
i) at least one metallocene compound of formula (I):

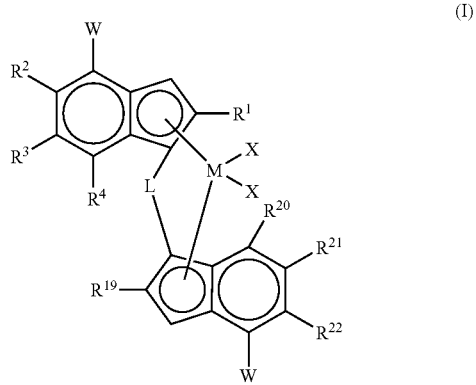

(I)

ii) an alumoxane or a compound that forms an alkyl metallocene cation; and optionally
iii) a first organo aluminum compound, thereby forming a polymer in an amount;
step b) contacting, under polymerization conditions, propylene or ethylene with at least one alpha olefin of formula $CH_2=CHT$, wherein T is hydrogen or a $C_1$-$C_{10}$ alkyl radical, and optionally a non-conjugated diene, in the presence of the polymer obtained in step a) and optionally in the presence of a second organo aluminum compound, provided that a homopolymer is not produced, thereby forming a polymer in an amount;
wherein the amount of the polymer obtained in step a) ranges from 5% by weight to 39% by weight of the polymer obtained in the whole process, and the amount of polymer obtained in step b) ranges from 61% by weight to 95% by weight of the polymer obtained in the whole process;
wherein in the compound of formula (I),
M is an atom of a transition metal selected from those belonging to group 4 of the Periodic Table of the Elements;
X, equal to or different from each other, is a hydrogen atom, a halogen atom, an R, OR, OR'O, $OSO_2CF_3$, OCOR, SR, $NR_2$ or $PR_2$ group wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical, optionally containing heteroatoms belonging to groups 13-17 of the Periodic Table of the Elements, and R' is a $C_1$-$C_{20}$-alkylidene, $C_6$-$C_{20}$-arylidene, $C_7$-$C_{20}$-alkylarylidene, or $C_7$-$C_{20}$-arylalkylidene radical;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or a $C_7$-$C_{20}$ arylalkylidene radicals, optionally containing heteroatoms belonging to groups 13-17 of the Periodic Table of the Elements, or it is a silylidene radical containing up to 5 silicon atoms;

$R^1$ and $R^{19}$ are different from each other and are a $Z^{1'}$ or $Z^{2'}$ group wherein $Z^{1'}$ is an alpha branched $C_1$-$C_{20}$ hydrocarbon radical optionally containing heteroatoms belonging to groups 13-17 of the Periodic Table of the Elements, and $Z^{2'}$ is a linear $C_1$-$C_{40}$ hydrocarbon radical optionally containing heteroatoms belonging to groups 13-17 of the Periodic Table of the Elements, with the proviso that if $R^1$ or $R^{19}$ are $Z^{1'}$ then $R^{19}$ or $R^1$ are $Z^{2'}$;

$R^2$ and $R^3$, are part of 4-7 membered ring condensed to the benzene ring of the indenyl moiety, said ring optionally containing heteroatoms belonging to groups 13-16 of the Periodic Table of the Elements, the valence of each atom forming said ring is filled with $R^{18}$ groups, wherein $R^{18}$, equal to or different from each other, are hydrogen atoms or a $C_1$-$C_{40}$ hydrocarbon radical, said ring can be saturated or it can contain double bonds;

$R^4$ is a hydrogen atom or a $C_1$-$C_{40}$ hydrocarbon radical optionally containing heteroatoms belonging to groups 13-17 of the Periodic Table of the Elements; and W is an aromatic 5 or 6 membered ring that can contain heteroatoms belonging to groups 15-16 of the Periodic Table of the Elements, the valence of each atom of said ring is substituted with hydrogen atom or it can optionally be substituted with $R^5$ groups, wherein $R^5$, equal to or different from each other, are $C_1$-$C_{40}$ hydrocarbon radicals optionally containing heteroatoms belonging to groups 13-17 of the Periodic Table of the Elements;

$R^{20}$, $R^{21}$ and $R^{22}$, equal to or different from each other, are hydrogen atoms or $C_1$-$C_{40}$ hydrocarbon radicals optionally containing heteroatoms belonging to groups 13-17 of the Periodic Table of the Elements.

2. The multistep process according to claim 1 wherein in the compound of formula (I), X is a hydrogen atom, a halogen atom, a OR'O or R group; L is $Si(R^{11})_2$, wherein $R^{11}$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; $R^4$ is a hydrogen atom a $C_1$-$C_{10}$-alkyl or a $C_6$-$C_{40}$-aryl radical; $R^{18}$ is a hydrogen atom or a linear or branched, $C_1$-$C_{20}$-alkyl radical; $R^2$ and $R^3$, form together a condensed saturated 3-7 membered ring optionally containing heteroatoms belonging to groups 13-16 of the Periodic Table of the Elements; and $R^{20}$ and $R^{21}$ are hydrogen atoms or $C_1$-$C_{10}$ alkyl radicals, with the proviso that they are not both $C_1$-$C_{10}$ alkyl radicals.

3. The multistep process according to claim 1 wherein W is selected from the moieties of formula (Wa), (Wb) and (Wc):

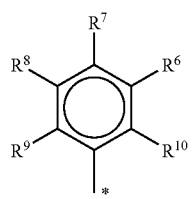
(Wa)

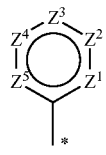
(Wb)

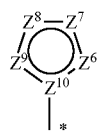
(Wc)

wherein the * represents the point in which the moiety bonds the indenyl moiety of the compound of formula (I);

$R^6$, $R^7$, $R^8$, $R^9$ and $R^{10}$, equal to or different from each other, are hydrogen atoms or $C_1$-$C_{40}$ hydrocarbon radicals optionally containing heteroatoms belonging to groups 13-17 of the Periodic Table of the Elements;

$Z^1$ is a nitrogen atom or a $CR^{10}$ group; $Z^2$ is a nitrogen atom or a $CR^6$ group; $Z^3$ is a nitrogen atom or a $CR^7$ group; $Z^4$ is a nitrogen atom or a $CR^8$ group; $Z^5$ is a nitrogen atom or a $CR^9$ group; provided that not more that 2 groups among $Z^1$, $Z^2$, $Z^3$, $Z^4$ and $Z^5$ are nitrogen atoms, $Z^6$ is an oxygen atom, a sulfur atom, a $NR^{13}$ group or a $CR^{13}$ group; $Z^7$ is an oxygen atom, a sulfur atom, a $NR^{14}$ group or a $CR^{14}$ group; $Z^8$ is an oxygen atom, a sulfur atom, an $NR^{15}$ group or a $CR^{15}$group; $Z^9$ is an oxygen atom, a sulfur atom, an $NR^{16}$ group or a $CR^{16}$ group;

$Z^{10}$ is a nitrogen atom or a carbon atom that bonds the indenyl moiety of the structure of formula (I), with the proviso that not more than 1 group among $Z^6$, $Z^7$, $Z^8$, $Z^9$ or $Z^{10}$ is a sulfur atom, an oxygen atom or a nitrogen-containing group atom selected from $NR^{13}$, $NR^{14}$, $NR^{15}$, $NR^{16}$, and a nitrogen atom; and $R^{13}$, $R^{14}$, $R^{15}$ and $R^{16}$, equal to or different from each other, are hydrogen atoms or $C_1$-$C_{40}$ hydrocarbon radicals optionally containing heteroatoms belonging to groups 13-17 of the Periodic Table of the Elements.

4. The multistep process according to claim 3 wherein, in the moiety of formula (Wa), $R^7$ is a $C_1$-$C_{40}$-alkyl radical, and $R^6$, $R^8$, $R^9$ and $R^{10}$ are hydrogen atoms.

5. The multistep process according to claim 3 wherein, in the moiety of formula (Wa), $R^{10}$ and $R^8$ are $C_1$-$C_{40}$-alkyl radicals and $R^7$, $R^8$ and $R^9$ are hydrogen radicals.

6. The multistep process according to claim 3 wherein, in the moiety of formula (Wa), $R^6$, $R^7$ and $R^8$ are linear or branched $C_1$-$C_{40}$-alkyl radicals and $R^{10}$ and $R^9$ are hydrogen atoms.

7. The multistep process according to claim 3 wherein, in the moiety of formula (Wa), $R^6$, $R^7$, $R^8$, $R^9$ and $R^{10}$ are hydrogen atoms.

8. The multistep process according to claim 3 wherein in the moiety of formula (Wb), when $Z^1$ is a nitrogen atom, $Z^2$, $Z^3$, $Z^4$ and $Z^5$ are respectively $CR^6$, $CR^7$, $CR^8$ and $CR^9$ or when $Z^3$ is a nitrogen atom $Z^1$, $Z^2$, $Z^4$ and $Z^5$ are respectively $CR^{10}$, $CR^6$, $CR^8$ and $CR^9$ or when $Z^2$ is a nitrogen atom $Z^1$, $Z^3$, $Z^4$ and $Z^5$ are respectively $CR^{10}$, $CR^7$, $CR^8$ and $CR^9$.

9. The multistep process according to claim 3 wherein in the moiety of formula (Wc), $Z^6$ is an oxygen atom, a sulfur atom or an $NR^{16}$ group, wherein $R^{16}$ is a $C_1$-$C_{40}$-alkyl radical.

10. The multistep process according to claim 1 wherein $Z^{1'}$ is a compound of formula of formula (II):

(II)

or an alpha branched aryl or arylalkyl radical containing from 2 to 20 carbon atoms optionally containing O, N, S, P and Se atoms;

wherein in the compound of formula (II), $R^{23}$ and $R^{24}$, equal to or different from each other, are $C_1$-$C_{40}$ hydrocarbon radicals optionally containing heteroatoms belonging to groups 13-17 of the Periodic Table of the Elements; $R^{25}$ is an hydrogen atom or it has the same meaning of $R^{23}$ and $R^{24}$; and $Z^{2'}$ is a linear $C_1$-$C_{20}$-alkyl, $C_2$-$C_{40}$ alkenyl, $C_2$-$C_{40}$ alkynyl radical, optionally containing heteroatoms belonging to groups 13-17 of the Periodic Table of the Elements.

11. The multistep process according to claim 10 wherein $R^{23}$ and $R^{24}$ are $C_1$-$C_{20}$-alkyl, $C_2$-$C_{40}$ alkenyl, $C_2$-$C_{40}$ alkynyl radicals, optionally containing heteroatoms belonging to groups 13-17 of the Periodic Table of the Elements; $R^{25}$ is a hydrogen atom; and $Z^{2'}$ is a linear $C_1$-$C_{10}$-alkyl radical.

12. The multistep process according to claim 3 wherein the compounds of formula (I) have formula (III):

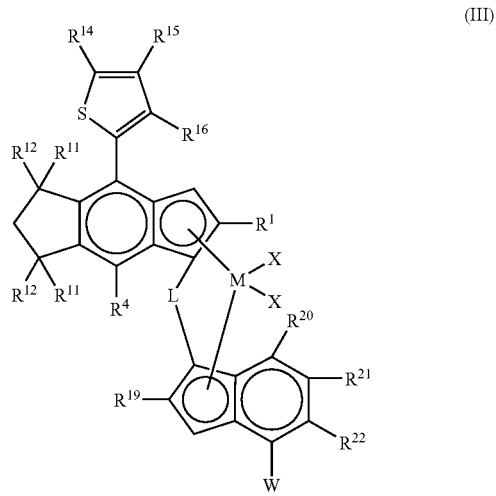
(III)

wherein $R^{11}$ and $R^{12}$, equal to or different from each other, are hydrogen atoms or $C_1$-$C_{40}$ hydrocarbon radicals optionally containing heteroatoms belonging to groups 13-17 of the Periodic Table of the Elements.

13. The multistep process according to claim 3 wherein the compounds of formula (I) have formula (IV):

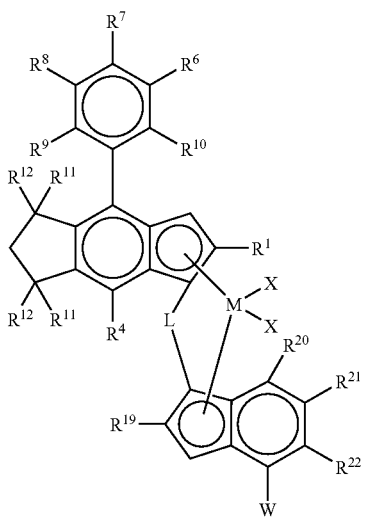

(IV)

wherein $R^{11}$ and $R^{12}$, equal to or different from each other, are hydrogen atoms or $C_1$-$C_{40}$ hydrocarbon radicals optionally containing heteroatoms belonging to groups 13-17 of the Periodic Table of the Elements.

14. The multistep process according to claim 13 wherein W is a moiety of formula (Wa).

15. The multistep process according to claim 1 wherein the catalyst system is supported on an inert carrier.

16. The multistep process according to claim 1 wherein step a) further comprises a prepolymerization step a-1).

17. The multistep process according to claim 1 wherein step a) and step
  b) are carried out in liquid phase, wherein the polymerization medium is an inert hydrocarbon solvent or the polymerization medium can be liquid propylene optionally in the presence of an inert hydrocarbon solvent, and of ethylene or one or more comonomer of formula $CH_2$=$CHT^1$ or $CH_2$=$CHT$, or steps a) or b) can be carried out in a gas phase.

18. The multistep process according to claim 1 wherein step a) is carried out in the presence of hydrogen.

19. The multistep process according to claim 1 wherein the polymer obtained in step a) is a propylene homopolymer or a propylene copolymer containing up to 20% by mol of derived units of ethylene or one or more alpha olefins of formula $CH_2$=$CHT^1$.

20. The multistep process according to claim 19 wherein the polymer obtained in step a) is a propylene homopolymer or a propylene/ethylene copolymer having an ethylene content lower than 10% by weight.

21. The multistep process according to claim 1 wherein step b) is carried out in the presence of hydrogen.

22. The multistep process according to claim 1 wherein the polymer obtained in step b) is an ethylene or propylene copolymer having from 4% by mol to 90% by mol, of derived units of comonomers of formula $CH_2$=$CHT$ and optionally up to 20% of derived units of non conjugated diene.

23. The multistep process according to claim 1 wherein in step b) propylene is copolymerized with alpha olefins of formula $CH_2$=$CHT$, wherein T is hydrogen or a $C_1$-$C_{10}$ alkyl radical, and optionally a non-conjugated diene, in the presence of the polymer obtained in step a) and optionally in the presence of a second organo aluminum compound, provided that a homopolymer is not produced.

24. The multistep process according to claim 1 wherein in step b) ethylene is copolymerized with an alpha olefins of formula $CH_2$=$CHT$, wherein T is hydrogen or a $C_1$-$C_{10}$ alkyl radical, and optionally a non-conjugated diene, in the presence of the polymer obtained in step a) and optionally in the presence of a second organo aluminum compound; provided that an homopolymer is not produced.

25. The multistep process according to claim 1 wherein in step a) from 10% to 38% by weight of the total polymer produced in the whole process is produced and in step b) from 62% to 90% by weight of the polymer obtained in the whole process is produced.

26. The multistep process of claim 1, wherein $R^2$ and $R^3$ are 5 or 6 membered rings, said ring optionally containing heteroatoms belonging to groups 13-16 of the Periodic Table of the Elements.

27. The multistep process of claim 10, wherein the compound of formula (II) or the alpha branched aryl or arylalkyl radical containing from 2 to 20 carbon atoms optionally contains O, N, and S atoms.

* * * * *